United States Patent
Wagner

[15] 3,693,495
[45] Sept. 26, 1972

[54] COMPOSITE SCREW
[72] Inventor: David P. Wagner, 8501 W. Higgins Road, Chicago, Ill. 60631
[22] Filed: Oct. 30, 1970
[21] Appl. No.: 85,524

[52] U.S. Cl. ............................................. 85/9 R, 85/54
[51] Int. Cl. ........................... F16b 15/02, F16b 23/00
[58] Field of Search ............ 85/9, 54, 53, 1 JP, 35, 1, 85/45, 50; 151/38, 37, 7

[56] References Cited

UNITED STATES PATENTS

| | | |
|---|---|---|
| 3,557,654 | 1/1971 | Weidner ..................... 85/9 R |
| 3,134,290 | 5/1964 | Jentoft ........................ 85/9 R |
| 2,678,585 | 5/1954 | Ellis ....................... 85/50 R X |
| 2,814,059 | 11/1957 | Lehning ................... 85/45 X |
| 3,241,422 | 3/1966 | Heimovics ................. 85/9 R |
| 2,385,851 | 10/1945 | Swanstrom ............... 151/7 X |
| 539,627 | 5/1895 | Lines ............................ 85/53 |
| 3,352,190 | 11/1967 | Carlson ..................... 85/9 R |
| 3,468,211 | 9/1969 | Suan ......................... 85/9 R |

FOREIGN PATENTS OR APPLICATIONS 991,961  5/1965  Great Britain ............... 85/9 R

*Primary Examiner*—Ramon S. Britts
*Attorney*—Robert W. Beart, Michael Kovac and Jack R. Halvorsen

[57] ABSTRACT

A composite threaded fastener in which a metal body including a head and washer portion having ribs formed thereon are encapsulated with a molded plastic outer surface, the outer surface and the head and washer interlocking through the interaction of the plastic and rib structure on the head and washer portion.

8 Claims, 11 Drawing Figures

PATENTED SEP 26 1972　　　　　　　　　　3,693,495

INVENTOR
David P. Wagner
BY
His Att'ys

COMPOSITE SCREW

BACKGROUND OF THE INVENTION

In the field of construction in general and metal building construction specifically, there has been a trend toward utilizing colored components. The use of such colored components or panels has prompted an effort to utilize fasteners and various other hardware which is complimentary to the color of the components. Painting the exposed surfaces of fastener elements has been done to enhance the overall attractiveness of the colored structure. Merely painting such elements however, has the drawback of not being entirely corrosive resistant.

Molded plastic heads on various fasteners may be used in these environments since the color of the plastic can be carefully coordinated with the color of the structure or panel being fastened. However, efforts to obtain an efficient and attractive composite molded plastic fastener have been found to strip from the metal head portion of the fastener when subjected to various levels of torque.

In efforts to raise the resistance to stripping or increase the torque level of a composite head, molded plastic heads have been made relatively large compared to the shank of the fastener. This has not all together solved the problem of relative motion between the metal portion of the fastener and the plastic head. Large headed fasteners also do not generally include a relatively large rigid bearing area since the plastic bearing area is easily deformed allowing sheet metal or the like to be pulled over and torn out around the head of the screw during various loads. Although it is known in the prior art to provide threaded fasteners with composite molded plastic heads, such devices are generally weak in capacity to withstand relatively high torque levels before stripping occurs between the plastic and the metal body of the fastener.

SUMMARY

It is an object of the invention to provide a composite plastic headed fastener which is capable of attractive color coordination with an associated colored building panel.

It is another object of the invention to provide a corrosive resistant threaded fastener which is aesthetically pleasing when utilized in association with a colored building.

It is still another object of the invention to provide a composite fastener which is capable of sustaining relatively large torque values while maintaining a relatively small head member.

Still another object of the invention is to provide a composite plastic head to a fastener with a high resistance to stripping between the plastic and the metal body of the fastener.

Still another object of the invention is the provision of a plastic headed fastener with a relatively large, non-deformable bearing surface for decreasing the possibilities of sheet material tearing out and pulling over the head of the fastener.

Yet another object of the invention is to provide a fastener unit with a relatively small head size for ease of driveability in and around corners.

These objects, as well as others, are achieved according to the present invention by providing a threaded fastener having a one-piece metal body and including a driving head portion and an integral washer or flange portion and at least partially encapsulating both the head and washer portion with a molded plastic material. The driving head includes longitudinal ribs and flutes for positive interaction with the molded plastic head and the washer or flange portion further including radial projections on at least one side thereof for further interaction between the molded plastic and the one-piece metal fastener. The interaction between the plastic and the projections on the washer portion thus effectively increase the stripping torque level of the composite fastener without unnecessarily enlarging the driving portion of the plastic outer surface of the composite fastener.

For a better understanding of the present invention, together with other and further objects thereof, reference is made to the following description, taken in conjunction with the accompanying drawings.

DETAILED DESCRIPTION OF THE INVENTION

Figure 1:
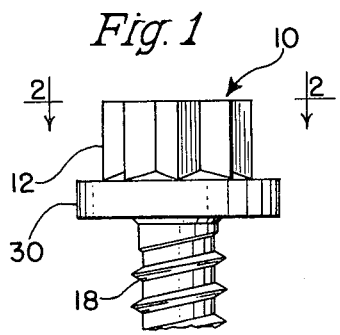
FIG. 1 is a partial side elevational view of the composite threaded fastener.
Figure 2:
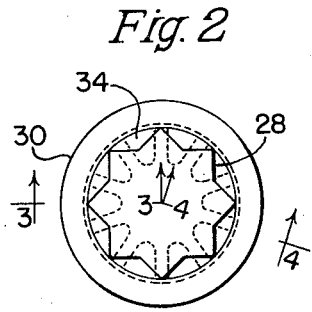
FIG. 2 is a top view of the fastener of FIG. 1.

Referring to the drawing, and in particular to FIGS. 1 and 2, there is shown a fastener unit 10 which includes a molded plastic head 12 on a head member 14 and washer portion 16. The head member 14 and washer portion 16 forming part of a one-piece metal body. The fastener 10 generally includes thread convolutions extending at least partially along the axial extent of a shank 18 on the meta body of the fastener.

The molded plastic exterior head 12 includes a configuration which may readily and efficiently accept a driving tool. In the preferred embodiment, the plastic head includes a plurality of longitudinal splines or corners 28. As shown in FIG. 2, eight radially spaced corners are formed on the plastic head in such a manner as to allow a small diameter standard double square socket to be efficiently utilized to transmit torque to the fastener unit. It can further be seen from FIGS. 1 and 2 that the driving portion of the plastic head 12 is just slightly larger than the threaded shank itself and thus presents a relatively small exposed surface which is desirable both aesthetically and operationally.

Figure 5:
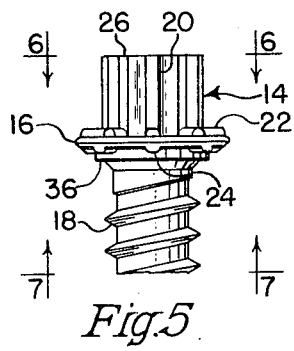
FIG. 5 is a side elevational view of the one-piece metal fastener in accordance with the present invention prior to the placement of the molded plastic head thereon.
Figure 6:
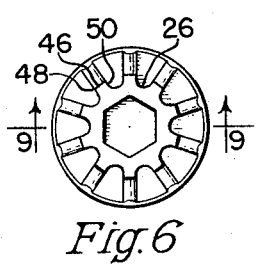
FIG. 6 is a top view of the one-piece fastener shown in FIG. 5.

In the preferred embodiment of the metal body portion, as shown in FIGS. 5 and 6, a metal blank may be cold headed to produce a one-piece fastener body including a head member 14, a washer or flange portion 16 and a shank portion 18.

To prevent rotation of the molded plastic portion 12 relative to the metal body, generally, and the head member 14 specifically, longitudinal ribs or projections 20 are formed on the head portion 14. These longitudinal ribs 20 may be formed by skiving the material of the head or by utilizing any other similar process. It can thus be seen from the sectional views of FIG. 3 and 4 that plastic material can be molded over the head portion of the fastener in such a manner as to firmly interlock the flowable plastic with the longitudinal ribs on the head member 14. A positive resistance is thus effectively created against relative movement of the plastic molded portion 12 to the metal body portion of the fastener unit. A reduction in this stripping action thus provides a composite fastener unit which is capable of accepting relatively high torque values and transmitting these torque values through the interaction of the splines and the molded plastic to the body of the fastener itself rather than causing movement of the plastic relative to the metal body prior to achieving the desired torque value.

Figure 7:
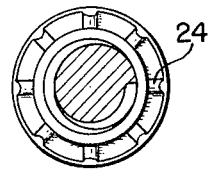
FIG. 7 is a sectional view of the fastener of FIG. 5 showing the underside of the washer portion of the one-piece metal body of the fastener.

The present invention is also concerned with transmitting the maximum amount of torque to a fastener while minimizing the diameter of the torque receiving head portion. This is accomplished in the present instance by the formation of torque receiving and transmitting radial ribs on the integral washer portion 16. FIGS. 5 through 7 show the placement of radial projections or ribs 22 on the upper surface of the washer portion 16 and also show radial projections or ribs 24 on the lower surface of the washer portion 16.

Turning again to FIGS. 3 and 4, it is shown that the plastic head encapsulates the washer portion 16 as well as the head portion 14. The plastic head 12 thus includes a base portion 30 which, in the preferred embodiment, is of a generally annular shape corresponding to the annular shape of the washer portion 16. It is apparent that the flowable molded plastic head 12 forms further interlock with the one-piece metal body by the interaction of the plastic material and the radial ribs 22 and 24 on the planar surface or surfaces of the washer portion 16. The present invention thus effectively increases the torque transmitted to a threaded fastener having a composite head of a relatively small diameter without increasing the turning force. This is accomplished by the effective increase of the moment arm through the interaction of the radial ribs 22 and/or 24 with the molded plastic head 12.

In carrying out the invention, it may be efficient, from a manufacturing standpoint, to produce the upper radial ribs 22 in essentially the same step as that which produces the longitudinal ribs 20. In this respect, FIG. 5 shows the number of radial ribs 22 equal to the number of longitudinal ribs 20. For illustrative purposes, ten such ribs shown. The radial ribs 22 are shown to be extensions, in the horizontal plane of the fastener, of the longitudinal ribs 20, each radial rib 22 lying in the same longitudinal plane as its associated longitudinal rib 20.

In further carrying out the invention, it may be desirable to form longitudinal flutes or valleys 26 between the longitudinal ribs 20. These flutes 26 extend into the head portion 14 a short radial distance beyond the base of the ribs 20. This will give more effective surface contact area with the molded plastic from which a more positive interlock between the plastic head 12, the head member 14 and washer 16 is accomplished.

Upon inspection of FIGS. 5 and 6 it will be seen that the ribs 20 are formed with a generally planar or slightly arcuate outer surface 46 joining radially extending side portions 50 at edges 48. The edges 48 thus provide a positive biting action into the associated plastic head 12 when the head 12 tends to rotate relative to the head member 14. This configuration will tend to eliminate stripping of the plastic from the metal which may occur when ribs with totally rounded outer surfaces are utilized.

It will be apparent that in addition to locking restrain against relative movement between the plastic head and the metal body and washer portion, there exists a locking restrain against relative axial movement of the plastic head with respect to the metal head portion 14. Upon inspection of FIGS. 3 and 4 it will be seen that the base portion 30 of the plastic head 12 at least partially encapsulates the washer portion 16 in such a manner as to preclude upward or downward motion of the plastic head relative to the metal body.

The present invention is also concerned with providing a relatively large, generally immovable and non-deformable bearing surface beneath the head of the fastener. The washer portion of flange 16 provides a rigid bearing surface which is particularly effective when utilized to fasten sheet material. With this relatively large bearing surface, the sheet material is generally prevented from ripping out from under the screw head and releasing itself from the fastened joint. It is obvious, however, that a large flange of relatively pure plastic or a similar deformable material, without the aid of a washer structure such as 16, would be unable to adequately restrain sheet material from ripping out from under the screw head during relatively high wind forces or the like.

In one method of constructing the composite threaded fastener 10 a complementary mold (not shown) is utilized to form plastic head 12 about the washer 16 and head member 14. Certain mold apparatuses contemplated by the present invention would require a bearing surface of the mold to be positioned beneath the washer portion 16 to adequately dimension the axial extend of the base portion 30 of the plastic head 12. The presence of radial projections 24 beneath the washer portion 16 precludes the placement of an appropriate mold in sealing juxtaposition beneath the washer portion 16. As a consequence, an annular ledge 36 is formed beneath the head member and washer portion of the one-piece metal body. With this ledge 36 an associated mold member may approach sealing association with the underside of the washer portion 16. This ledge 36 thus precludes the flowable plastic material from squirting down the screw shank. Upon further inspection of FIGS. 3 and 4 there will be seen that the undersurface 32 of the base 30 on the plastic head 12 extends generally in the same plane as the undersurface of the ledge 36. The inner periphery of the lowermost portion of the plastic head 12 thus is molded against the limited axial extend of the ledge 36. In actual practice, a complete seal between the mole (not shown) and the ledge 36 is not possible and therefore, a thin flash of plastic may exist between the ledge and the mold and the head becomes completely encased up to the screw shank.

Attention is drawn to the fact that the axial extent of the ledge portion 36 is limited. However, the ledge must necessarily extend beyond the radial projection 24 on the underside of the washer 16 in order to allow the plastic adequate interaction with the radial projections 24.

Figure 8:
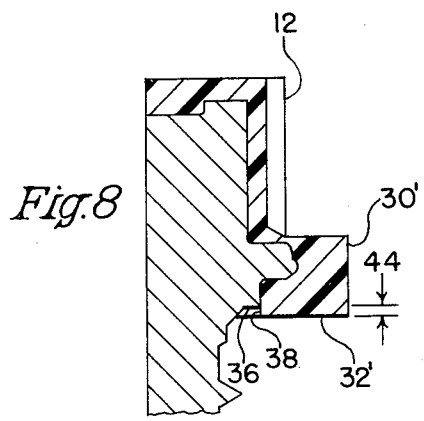
FIG. 8 is a sectional view taken along the line 4—4 of FIG. 2 of an alternate embodiment of the present invention.

An alternate embodiment of the present invention is shown in FIG. 8. While the preferred embodiment shown in FIG. 3 discloses the bearing surface of the ledge 36 and the bearing surface of the base 30 of the plastic head 12 to be substantially coplanar, it is contemplated that the plastic base 30 can extend for a limited extent downward form the ledge 36. This may be accomplished by utilizing a suitable mole (not shown) with a relief portion enabling the flow of plastic to extend a short distance 44 beneath the lowermost surface of the ledge 36. Thus the base portion 30', with the extended sealing surface 32' may act as a compressible sealing means beneath the washer portion.

Figure 9:
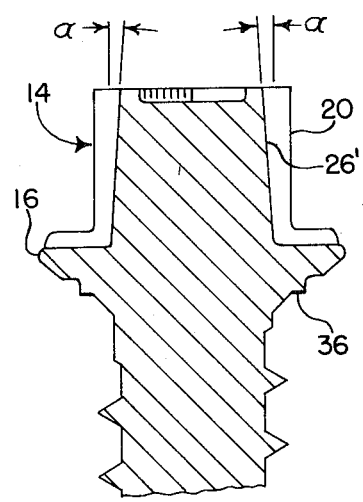
FIG. 9 is an enlarged partial cross-sectional view taken along line 9—9 of FIG. 6 showing an alternate embodiment of the present invention.

Another embodiment of the invention shown in FIG. 9 discloses the use of flute portions 26' slightly tapered at an angle α while the rib portions 20 remain substantially vertical. This alternate configuration thus provides an increase in the plastic to metal interlocking area without totally reducing the flute diameter of the head and thus avoiding the decrease in effective cross-section of the metal head. This tapered flute configuration may also provide a wedging force on the head 14 as axial face is applied downwardly by an associated tool (not shown). This wedging force serves to increase the resistance to relative movement the plastic head 12 and the head member 14.

Figures 3, 4:
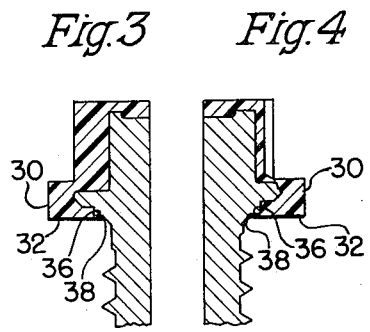
FIG. 3 is a partial sectional view taken along the line 3—3 of FIG. 2.
FIG. 4 is a partial sectional view taken along the line 4—4 of FIG. 2.
Figure 10:
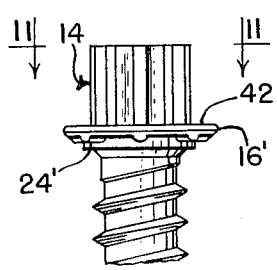
FIG. 10 is a side elevation similar to FIG. 5 of an alternate embodiment of the present invention.
Figure 11:
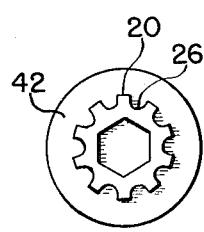
FIG. 11 is a top view of the invention described in FIG. 10.

The present invention also contemplates a modification as shown in FIGS. 10 and 11. While the preferred embodiment describes the annular washer 16 as having radial ribs or projections on both the upper surface and the lower surface of the washer, in certain applications, the use of radial projections 24' on the undersurface of the washer 16' while retaining a substantially flat upper surface, may be acceptable. The wrap-around feature of the plastic head 12, as descrbed more fully in relation to FIGS. 3, 4 and 8, shows that the plastic will interact with the projection 24' in such a manner as to effectively increase the torque transmitted to the fastening unit through the plastic head. The ribs 24' will also reduce the possibility of stripping between the plastic head and the metal body as described more completely above. While the mechanical interlocking between the plastic head and the washer 16' may be somewhat less than that of the preferred embodiment, it is anticipated that there will be various applications for the composite fastener in which the torque required for complete fastening may be relatively small but yet large enough to necessitate increasing the torque by substantially increasing the diameter of the head through the use of the washer and radial ribs 24'. It should be noted that this embodiment does include the longitudinal ribs for sustaining the interlock between the plastic head 12 and the metal head member 14.

Through the use of a plastic head which substantially encapsulates a metal head member of a one-piece metal body, a composite threaded fastener is provided which is substantially corrosive resistant. The integral, relatively large, rigid, washer portion of the metal body of the fastener unit provides a fastener with the above corrosive resistance properties which is further acceptable and efficient for use with sheet metal products where heretofore had a tendency to rip out from under the head of the fastener. The plastic headed fastener thus is capable of fastening colored building materials while remaining aesthetically pleasing by virtue of color coordinating the plastic with the associated metal panel.

In accordance with this invention a composite plastic headed fastener is provided which enables a relatively small head to transmit relatively large torque values to the unit through the interaction of the plastic with longitudinal ribs on the head portion of the metal body as well as the interaction of the plastic with radial ribs on an integral washer base. Since the integral washer is on a larger diameter than the metal head, an increased torque resistance to slippage between the plastic head portion and the metal head portion will result through the use of the radial ribs which effectively increase the diameter of torque transmission to the threaded fastener.

While the head portion has been shown with a particular dimensional relationship to the shank 18 of a threaded fastener, it should be understood that various relationships could exist within the scope of the invention. While it is shown that both the root and crest diameter of the longitudinal ribs are slightly larger than the root diameter of the threaded shank, it is contemplated that the root and/or crest diameter of the ribs 20 could be equal to or slightly less than the root diameter of the threaded shank 18 and still fulfill the objects of this invention.

Thus, it is apparent there has been provided in accordance with the invention a composite plastic headed fastener that fully satisfies the objects, aims and advantages set forth above. While the inventions has been described in conjunction with specific embodiments thereof, it is evident that many alternatives, modifications, and variations as fall within the spirit and scope of the appended claims.

What is claimed is:

1. A fastener unit including a one-piece metal body with a composite plastic head portion, the metal body including a small cylindrical head portion being continuous throughout the periphery thereof a threaded shank portion and a load bearing and torque transmitting flange portion having an upper and lower surface, said flange extending radially outwardly from the head portion, and said threaded shank portion extending downwardly from the flange, the cylindrical head portion of the metal body having a diameter generally corresponding to the diameter of the threaded shank portion and including a plurality of external torque transmitting vertical splines, the flange portion of the metal body including a plurality of radially directed axial projections on at lease one substantially radially extending surface thereof, a plastic member molded over and encapsulating the head and covering both the upper and lower surface of the flange member of the metal body and forming external head and flange portions corresponding to the head and flange of the metal body, the outer diameter of the external head portion being less than the outer diameter of the flange portion of the metal body, said vertical splines interlocking with the external head portion and the axial projections interlocking with the external flange portion of the molded plastic member to prevent relative rotation between the plastic member and the metal body as well as precluding relative axial movement between the metal head and the plastic head portion, the axial projections also providing means for effectively increasing the torque accepting diameter of the relatively small head on the metal body, the external head portion including a plurality of tool engaging projections.

2. A fastener unit in accordance with claim 1 wherein the plurality of axial projections are located on the lower surface of the flange portion.

3. A fastener unit in accordance with claim 2 wherein an annular ledge extends for a limited extent, axially downward from the lower surface of the flange portion, the diameter of the ledge being less than the diameter of the flange portion and the axial extent of the ledge being greater than the axial projections from the lower surface of the flange portion.

4. A fastener unit in accordance with claim 2 wherein the plastic head portion abuts the periphery of the annular ledge and extends downwardly for a limited axial extent beyond the axial extent of the ledge whereby the lowermost portion of the plastic head portion acts as a compressible sealing means beneath the flange portion.

5. A fastener unit in accordance with claim 2 wherein the plastic head portion encapsulates the ledge and forms a generally planar annular surface extending from the shank to the outer periphery of the plastic head.

6. A fastener unit in accordance with claim 1 wherein the head member includes vertical flutes disposed between the vertical splines to present an alternating series of splines and flutes.

7. A fastener unit in accordance with claim 6 wherein the vertical flutes are tapered presenting a smaller root diameter for the head at its uppermost portion than at the juncture of the head and the washer portion.

8. A fastener unit in accordance with claim 1 wherein the tool engaging projections comprise a plurality of longitudinal splines configured to form eight corner projections.

* * * * *